US011388727B1

(12) United States Patent
Argenti

(10) Patent No.: US 11,388,727 B1
(45) Date of Patent: Jul. 12, 2022

(54) OPPORTUNISTIC SWITCHING AMONG COMMUNICATION CHANNELS TO TRANSMIT AN UPDATE TO AN EDGE DEVICE

(71) Applicant: Amazon Technologies, Inc., Seattle, WA (US)

(72) Inventor: Marco Argenti, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 16/137,998

(22) Filed: Sep. 21, 2018

(51) Int. Cl.
*H04W 72/08* (2009.01)
*H04W 40/02* (2009.01)

(52) U.S. Cl.
CPC ......... *H04W 72/085* (2013.01); *H04W 40/02* (2013.01)

(58) Field of Classification Search
CPC ..................................................... H04W 40/02
See application file for complete search history.

(56) References Cited

U.S. PATENT DOCUMENTS 6,295,294 B1 * 9/2001 Odlyzko ................ H04L 12/14 370/234
7,180,858 B1 * 2/2007 Roy .................... H04L 43/0888 370/229
9,686,071 B2 6/2017 Min et al.
10,419,176 B2 * 9/2019 Tavildar ................ H04L 5/0053
2004/0205158 A1 * 10/2004 Hsu ....................... H04W 48/18 709/218
2006/0215698 A1 * 9/2006 Hamdan ................. H04L 47/35 370/471
2007/0091836 A1 * 4/2007 Oprescu-Surcobe ........................ H04W 52/0225 370/318
2017/0054470 A1 2/2017 Reza et al.
2018/0024828 A1 * 1/2018 Nogueira-Nine ....... G06F 8/654 717/173
2018/0063748 A1 * 3/2018 Ling ....................... H04L 43/16

* cited by examiner

*Primary Examiner* — James P Duffy
(74) *Attorney, Agent, or Firm* — Robert C. Kowert; Kowert, Hood, Munyon, Rankin & Goetzel, P.C.

(57) ABSTRACT

An update service of a provider network transmits an update to an edge device by opportunistically selecting one communication channel (or transmission bandwidth) over another (e.g., based on analysis of performance metrics associated with the channel) to transmit different portions of the update to the edge device. For example, the update service may choose the channel with highest available bandwidth or the channel with the lowest failure rates. The update service may receive indications from the edge device that transmission of different update portions was successful. In some cases, the edge device itself may instead perform the selection of one communication channel over another (e.g., based on analysis of channel metrics) to receive different portions of the update at the edge device. The edge device may transmit indications that the edge device successfully received different portions of the update.

20 Claims, 8 Drawing Sheets

OPPORTUNISTIC SWITCHING AMONG COMMUNICATION CHANNELS TO TRANSMIT AN UPDATE TO AN EDGE DEVICE

BACKGROUND

The Internet of Things (IoT) is a phrase given for the interconnection of computing devices scattered around the globe within the existing internet infrastructure. IoT devices, also referred to herein as edge devices, may be embedded in a variety of products for industrial or consumer applications, such as sensors, actuators, turbines, manufacturing devices, home appliances, printers, automobiles, thermostats, smart traffic lights, video cameras, etc.

To ensure that a given edge device performs reliably and optimally, an update (e.g., software, firmware, etc.) may be applied when it becomes available. For example, a software update may add new functionality to the edge device. In many cases, a software update may keep the edge device secure from attacks or optimize software in order to obtain the maximum life from existing hardware.

Transmitting an update to an edge device may be a time-consuming and error-prone process. For example, the communication channel used to transmit the update to the edge device may have a low-bitrate connection, may degrade in performance, or may be interrupted due to adverse environmental or network conditions. This can result in an undesired delay when updating the edge device or, in some cases, incomplete transmission of the update.

Figure 1:
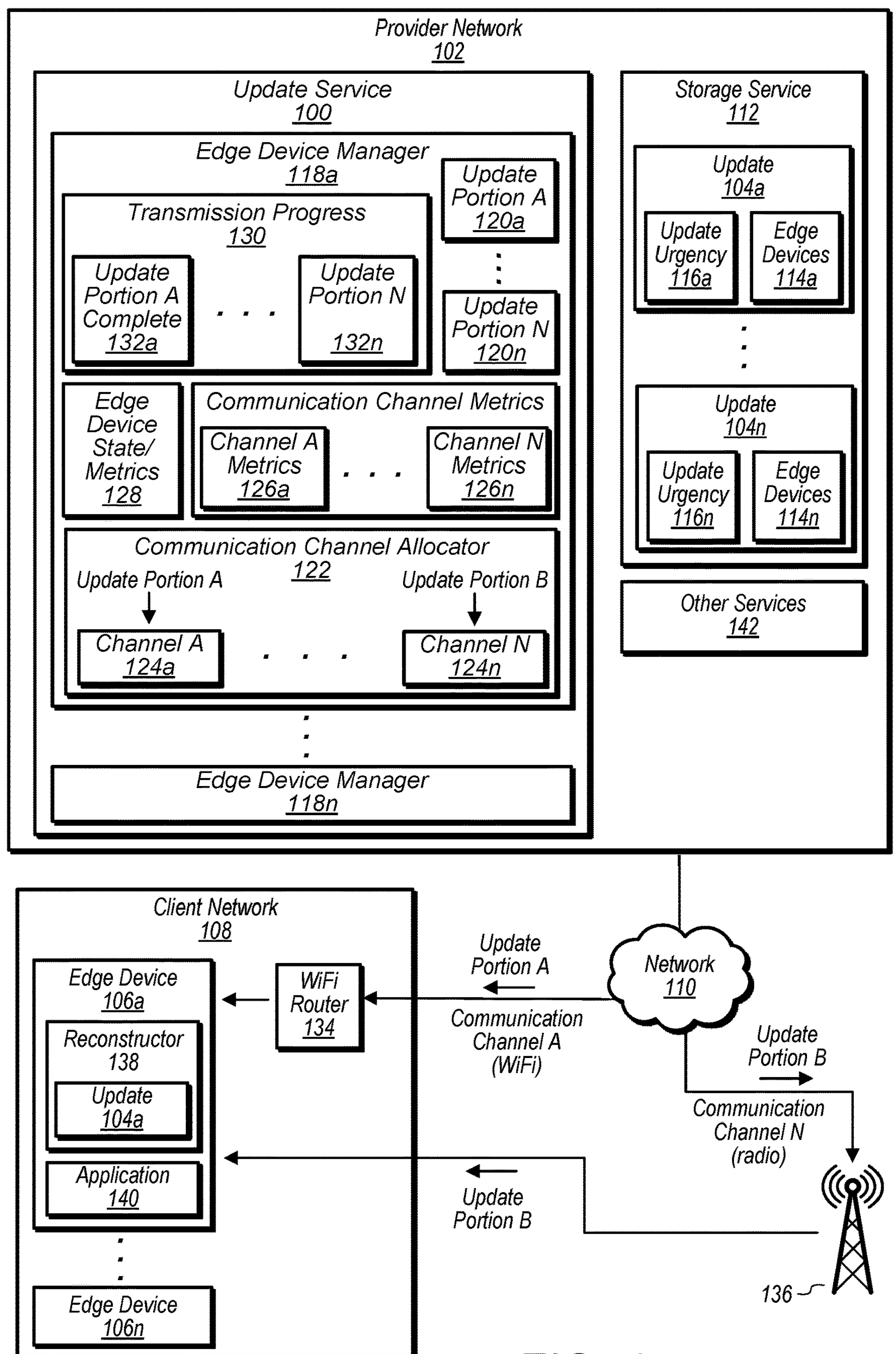
FIG. 1 illustrates a system for opportunistic switching among communication channels to transmit an update to an edge device, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for using opportunistic switching among communication channels to transmit an update (e.g., software or firmware update) to an edge device. Transmission of one or more initial portions of an update to an edge device may occur using one channel (e.g., satellite). After analyzing the current conditions of the available channels (e.g., available bandwidth, transmission failures rates, or other metrics for the available channels), a different channel may be opportunistically selected (e.g., Wi-Fi) to transmit one or more other portions of the update to the edge device. In embodiments, switching channels may occur any number of times across any number of channels until all of the update portions are received at the edge device. The edge device then reconstructs the update and applies the update.

In various embodiments, an update service of a provider network may perform the opportunistic switching described above to transmit an update to one or more edge devices. In some embodiments, the edge device itself may perform at least some of functions described above in order to implement opportunistic switching to receive an update. For example, an edge device may analyze transmission performance metrics for different communication channels and in response, switch from a current channel to a new channel (e.g., from Wi-Fi to satellite).

In various embodiments, any suitable security communication protocols may be used to protect data that is being sent between any devices and/or networks (e.g., provider network, client network, edge devices, cellular networks, etc.). For example, data may be encrypted using SSL (secure socket layer), TLS (transport layer security), HTTPS (secure hypertext transfer protocol), and/or any other suitable network security protocol.

In embodiments, by providing a single place for a client to put a new version of software (e.g., using the update service and/or storage service), the time required to update multiple edge devices may be reduced and errors associated with the update may be reduced or eliminated. Furthermore, embodiments may reduce the amount of time required to transmit an update to one or more edge devices by analyzing channel metrics and switching to higher-bandwidth channels to transmit portions of an update to the one or more edge devices. In embodiments, the edge device may consume less energy and/or extend battery life based on analysis of channel metrics and/or edge device metrics and switching to channels that require less power consumption to receive portions of the update.

In various embodiments, the number of failures and/or the failure rate for transmitting update portions to the edge device may be reduced by analyzing channel metrics and switching to another channel that has fewer failures and/or a lower failure rate. In various embodiments, some or all of the analysis, channel switching, or any other functionality described herein may be implemented by the update service, by the edge device, or by both the update service and the edge device.

FIG. 1 illustrates a system for opportunistic switching among communication channels to transmit an update to an edge device, according to some embodiments. In the illustrative embodiment, an update service 100 of a provider network 102 transmits one or more updates 104 (e.g., firmware and/or software updates) to one or more edge devices 106 of a client network 108.

The updates may be transmitted to the edge devices 106 of the client network 108 via a wide-area network 110 (e.g., the internet). The update service may also receive data from the edge devices 106 of the client network 108 via the wide-area network 110. Thus, the provider network 102 may be considered a remote provider network and may be in another physical location than the edge devices 106 of the client network 108, such as another city, state, or country. In embodiments, the update service 100 may also transmit updates to any number of other edge devices of the client network 108 and/or any number of other client networks.

Figure 2:
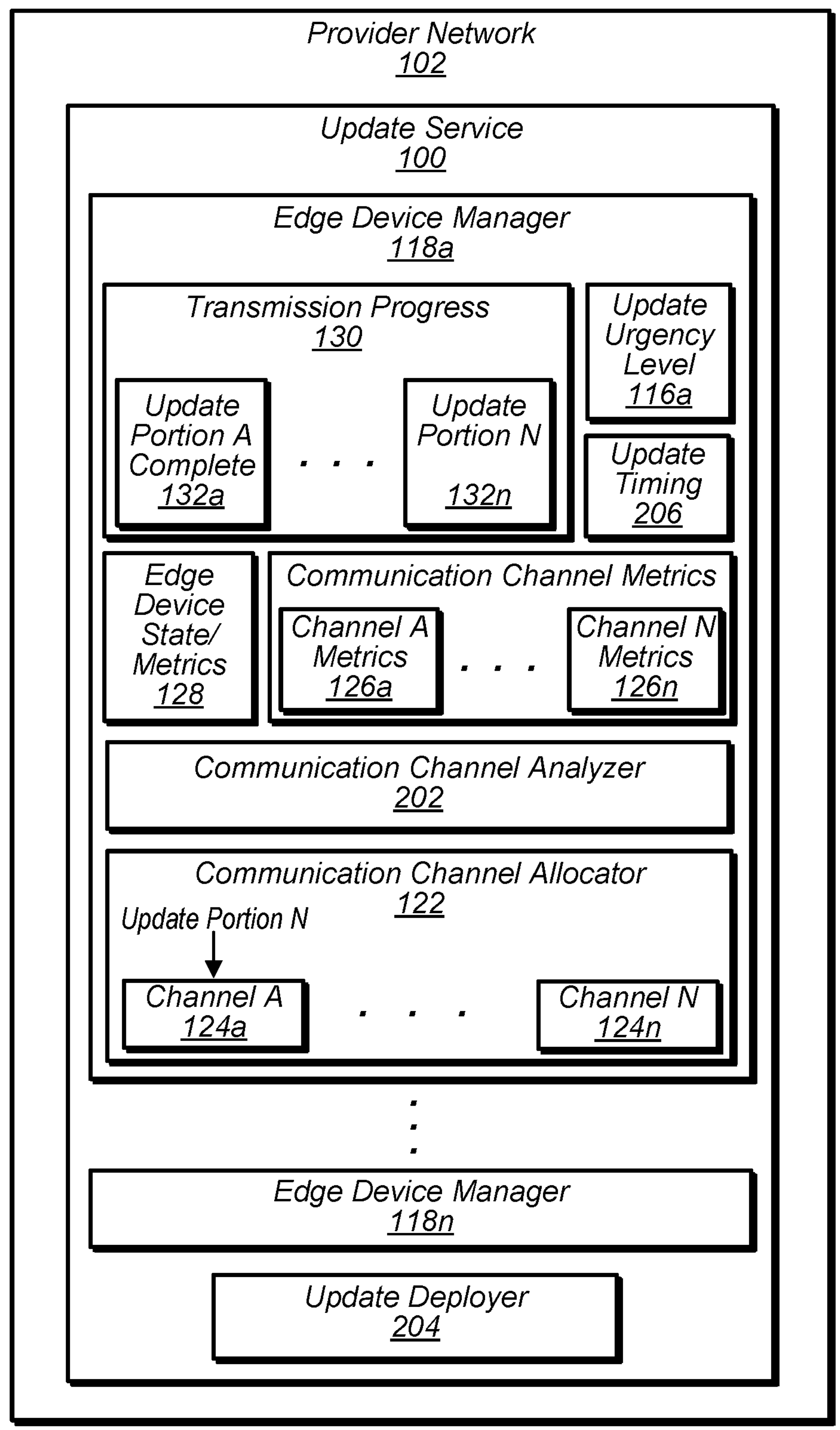
FIG. 2 is a block diagram of an update service that implements opportunistic switching among communication channels to transmit an update to an edge device, according to some embodiments.
Figure 3:
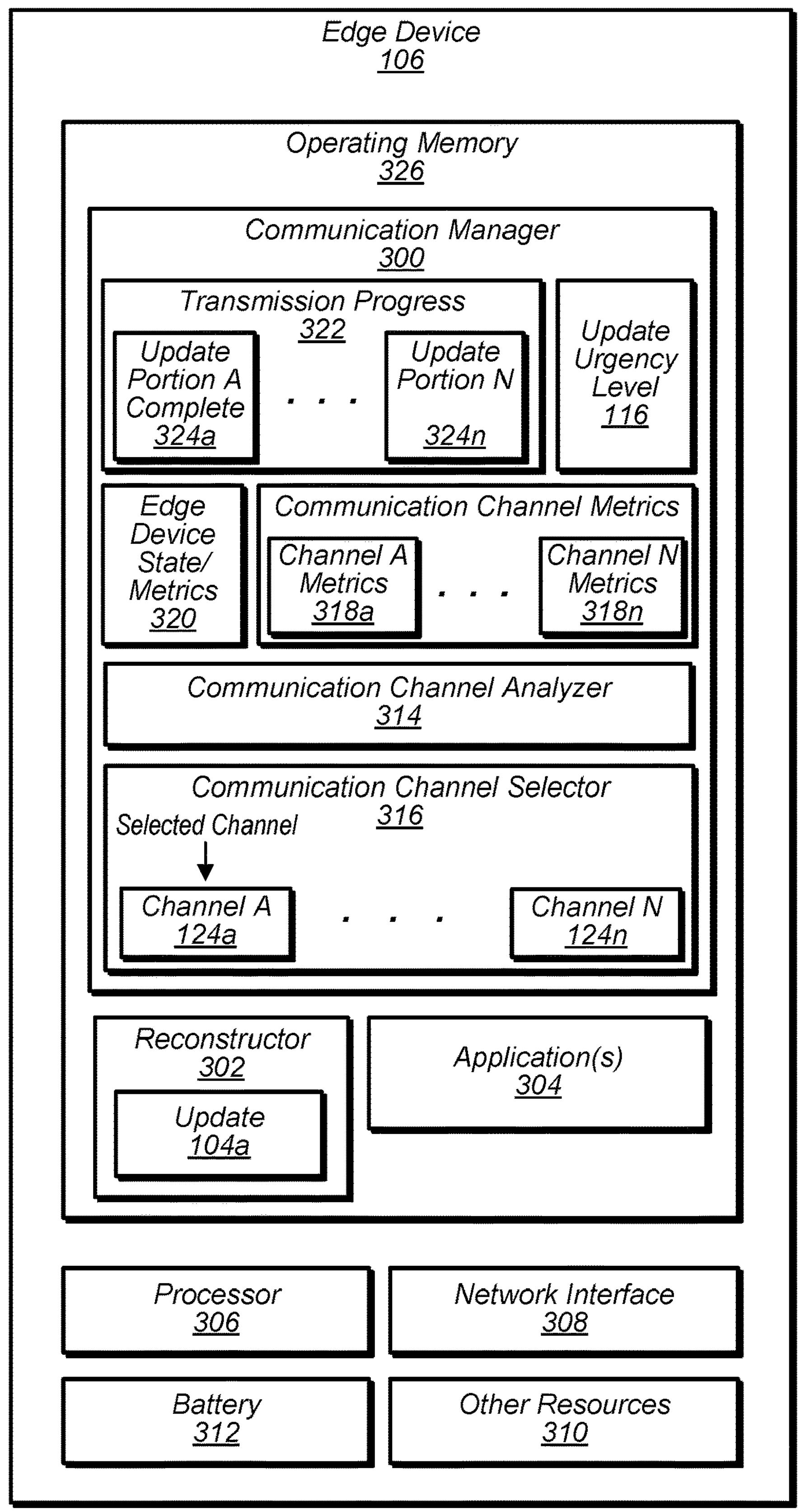
FIG. 3 is a block diagram of an edge device that implements opportunistic switching among communication channels to receive an update, according to some embodiments.
Figure 4:
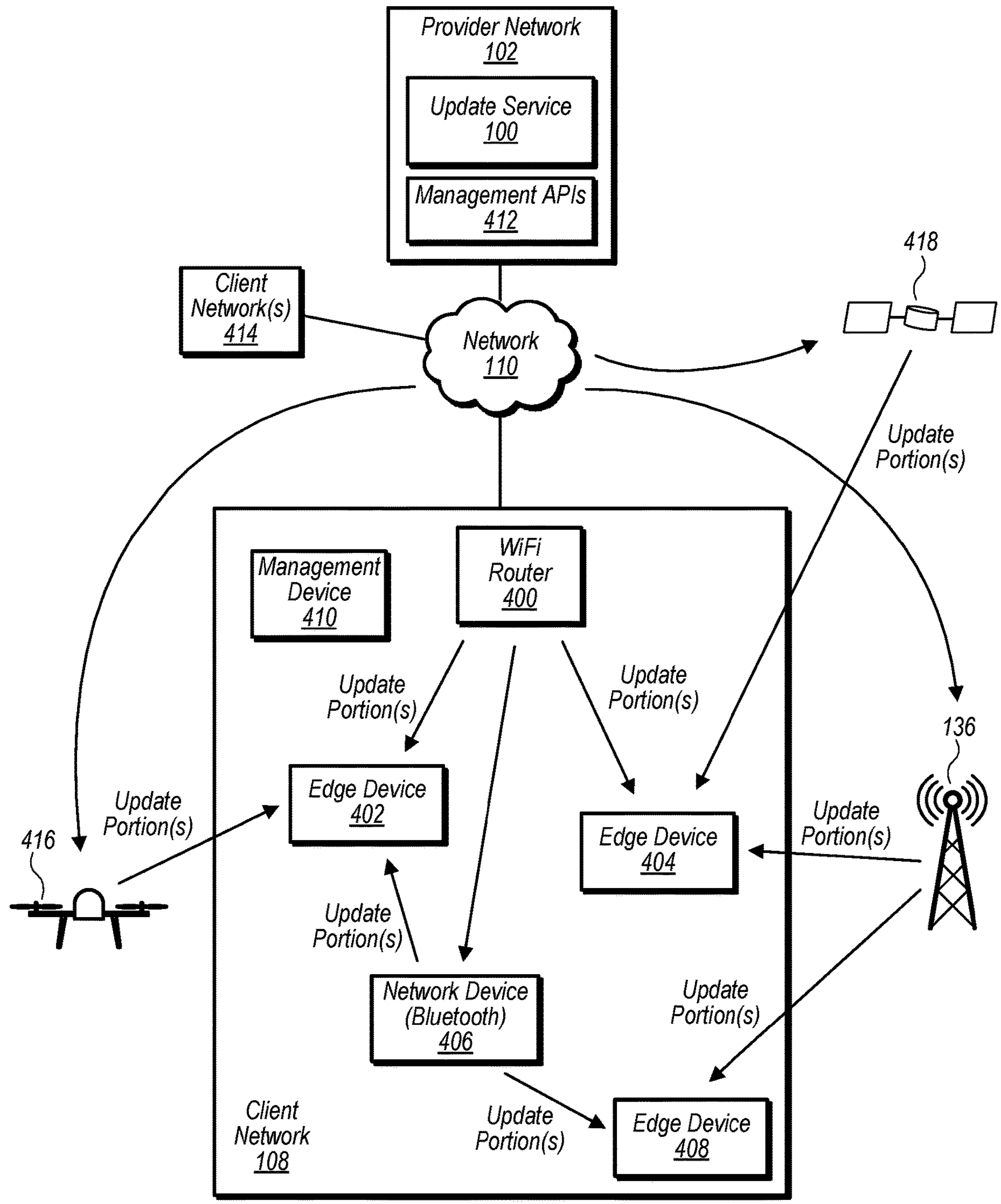
FIG. 4 illustrates a system for opportunistic switching among communication channels to transmit updates to different edge devices of a client network, according to some embodiments.

In embodiments, the provider network 102, client network 108, edge devices 106, and any other components depicted in FIG. 1 may be the same as or include one or more of the same components as the provider network, client network, edge devices, and any other components depicted in any of FIGS. 2-4, in embodiments. In embodiments, the provider network, client network, edge devices, and any other components depicted in any one of FIGS. 1-4 may be the same component as (e.g., same type of component) or include one or more of the same components as a provider network, client network, edge devices, and any other components depicted in any other one of FIGS. 1-4.

In the depicted embodiment, the provider network 102 includes a storage service 112 that stores the updates 104. Each of the updates 104 are available to be transmitted to one or more edge devices 106 for application of the update 104 to the one or more edge devices 106. In various embodiments, an update 104 may include data that can be used to update software functionality and/or firmware functionality (e.g., modify and/or add new functionality for a processor or other hardware component) when applied to an edge device. Therefore, an update 104 may include a software update and/or a firmware update. In some embodiments, an update 104 may include new software to be installed on the edge device 106.

In the example embodiment, an update 104 may be designated for application to one or more particular edge devices 114. Thus, edge devices 114 may be a list of edge devices 106 or any other data that identifies one or more of the edge devices 106 that the update 104 is designated for. As shown, an update urgency 116 level may also be assigned to an update 104. As discussed below, the update urgency 116 level of an update 104 may be used as one of the criteria to determine which communication channels will be used to transmit the one or more portions of the update 104 to edge devices 106. For example, a high update urgency 116 may cause selection of a channel with high (or highest) available transmission bandwidth.

In embodiments, one or more of the updates 104 may be provided by the provider network and/or by a remote provider of the update 104. For example, a manufacturer of an edge device or manufacturer of one or more components of the edge device may provide one or more of the updates 104 to the provider network. As another example, a manufacturer of software installed on the edge device may provide one or more updates 104 for the software to the provider network. In some embodiments, a client of the provider network may upload an update to the provider network so that the update can be distributed to client edge devices located in one or more of the client's networks at different geographical locations.

In the depicted embodiment, the update service 100 includes an edge device manager 118 that manages the transmission of an update 104 for each edge device 106 that is to receive an update 104. As shown, the update service 100 may instantiate any number of edge device managers 118 in order to transmit updates to any number of edge devices. In some embodiments, only one edge device manager is used to perform transmit updates to multiple edge devices and to perform any other functionality described herein with respect to the multiple edge device managers.

As shown, the edge device manager 118*a* splits an update into N portions 120 (update portion A 120*a*-update portion N 120*n*). In embodiments, any suitable technique may be used to split an update into multiple portions. For example, an update may be divided into any number of equally or substantially equally sized segments of update data. In embodiments, after all of the portions of an update are received at an edge device, the edge device may reconstruct the update, as discussed below.

In embodiments, the update service 100 may use implement code signing to sign the update (e.g., using a private key) before splitting it into portions. After the edge device receives all of the update portions and reconstructs the update, the edge device may verify authenticity and/or integrity of the reconstructed update based on the code signing (e.g., using a public key). In embodiments, the above method of verification through code signing may be used for each update portion that is transmitted to the edge device. For example, the update service 100 may sign each update portion (e.g., using a private key). After the edge device receives an update portion, it may verify authenticity and/or integrity of the update portion based on the code signing (e.g., using a public key). In embodiments, code signing may be used to verify each update portion as well as the entire update (e.g., once it is reconstructed at the edge device).

In some embodiments, after the edge device manager 118*a* splits the update into portions 120, the edge device manager 118*a* begins transmitting the portions to an edge device. To do so, the communication channel allocator 122 of the edge device manager 118*a* may assign one or more portions 120 to a particular channel 124 and transmit the one or more portions 120 using the assigned channel 124. In some embodiments, a particular channel 124 may be assigned as the default initial channel to transmit the first one or more portions of the update. In some embodiments, the initial channel may be selected by the channel allocator based on channel metrics 126 and/or edge device state/metrics 128, as described below.

In various embodiments, any communication channel suitable for sending data to an edge device may be selected to transmit one or more portions 120 of an update (e.g., Wi-Fi, cellular, Bluetooth, digital subscriber line, microwave, satellite, radio, infrared, visible light, and audio). In embodiments, the assigned communication channel 124 may represent the assigned channel that the edge device receives the one or more portions of the update (e.g., update portion A is assigned to channel A). In embodiments, the one or more portions of the update may be transmitted from the provider network using one or more other intermediate communication channels (e.g., provider network communication channels, fiber, cable, etc.) before the edge device directly receives the portion of the update on the assigned communication channel 124 (e.g., Wi-Fi, radio, satellite, etc.).

In embodiments, the channel initially selected to begin transmitting one or more portions of the update 104 to the edge device may be selected based on one or more initial metrics 126 associated with different available communication channels. In some embodiments, the edge device manager 118 may receive one or more initial metrics associated with each communication channel that is initially available to send data to the edge device, analyze the one or more initial metrics for each channel, and then select one of the channels to transmit the initial one or more portions of the update based on the analysis.

For example, the edge device manager 118 may determine, based on the analysis, that channel A has the greatest available bandwidth for data transmission and therefore select channel A to transmit the first one or more portions (e.g., update portion A 120*a*). In embodiments, the edge device manager 118 may determine, based on the analysis, that using channel A allows the edge device to receive data while consuming the least amount of power. Therefore, the edge device manager 118 may select channel A to transmit the first one or more portions. In various embodiments, the edge device manager 118 may use one more criteria (e.g., greatest bandwidth, least power consumed, etc.) to select a channel to transmit the first one or more portions based on analysis of channel metrics.

After the first one or more portions of the update are transmitted, the update service may receive one or more indications from the edge device that transmission of one or more of the portions of the update using the selected communication channel was successful. As shown, the update service 100 keeps track of the transmission progress 130 of the update to the edge device by storing an indicator 132 for each portion that indicates whether transmission of the portion to the edge device was successful. In some embodiments, the update service re-transmits an update portion to the edge device using the channel if it does not receive an indication of successful transmission from the edge device within a threshold period of time (e.g., 45 seconds, 10 minutes, etc.). In embodiments, this may be considered a transmission failure for the update portion.

After one or more initial update portions are transmitted and/or after one or more indications of successful transmission are received, the update service may receive one or more metrics associated with one or more (or all) of the available communication channels for transmitting update portions to the edge device. In embodiments, the metrics may be received from the edge device (e.g., collected at the edge device and/or generated by the edge device). For example, the metrics may include a rate of data transmission to the edge device using different channels, interference levels, channel noise levels, or a rate of energy consumed by the edge device due to data transmission to the edge device using different channels.

In some embodiments, the above metrics may be provided for different transmission bandwidths (e.g., transmission speeds) for each of one or more channels. Therefore, in some embodiments, channel metrics may include metrics for multiple transmission bandwidths that are available for each of one or more channels. Moreover, in various embodiments, selecting a communication channel for transmitting update portions may include selecting a particular transmission bandwidth (e.g., data transmission speed or bit rate) of multiple available transmission bandwidths for the communication channel.

In embodiments, one or more of the metrics for one or more (or all) corresponding channels may be received from the edge device manager or other component of the provider network. For example, the metrics may include a rate of transmission failures of data portions to the edge device for one or more channels or a number of transmission failures of data portions to the edge device over a period of time for one or more channels (or total number of transmission failures using the one or more channels).

In some embodiments, the metrics may be associated with and/or indicate one or more new communication channels that were not available for transmission when the edge device manager received the one or more initial metrics associated with the initially available communication channels. For example, a new Wi-Fi channel using a Wi-Fi router 134 or a new radio channel using a radio tower 136 may have become available due to movement of the edge device. In some embodiments, initial metrics provided for the new channels may be default metrics or estimated metrics (e.g., based on based on default specifications for transmission bandwidth to the edge device or power consumption by the edge device when using the communication channel).

After receiving the metrics, the update service may analyze the metrics. The analysis may include comparing metrics from one channel to metrics of one or more of the other channels (or comparing metrics of all channels to each other). For example, the update service may determine, based on comparing metrics, that available bandwidth to transmit data using another communication channel is greater than available bandwidth to transmit data using the communication channel that was initially selected. In response to the determination, the update service may select the other communication channel and transmit one or more other update portions to the edge device using the newly selected channel.

In some embodiments, the analysis may include comparing metrics between different transmission bandwidths of the same channel (e.g., the current channel and/or other channels). For example, the update service may determine, based on comparing metrics, that a new transmission bandwidth (e.g., a different transmission frequency for a Wi-Fi channel or a radio channel) is available for the current channel and is greater than the transmission bandwidth for the current channel that was initially selected. In response to the determination, the update service may select the new transmission bandwidth and transmit one or more other update portions to the edge device using the newly selected transmission bandwidth.

As another example, the update service may determine, based on comparing metrics, that an amount of power consumed by the edge device to receive data using another communication channel (or transmission bandwidth) is less than an amount of power consumed by the edge device to receive data using the communication channel. In response to the determination, the update service may select the other communication channel (or transmission bandwidth) and transmit one or more other update portions to the edge device using the newly selected channel (or transmission bandwidth). In embodiments, the update service may apply any other criteria to determine which new channel (or transmission bandwidth) to switch to. In some embodiments, the update service may apply a combination of two or more criteria to determine which new channel (or transmission bandwidth) to switch to.

In embodiments, the metrics received by the update service may include one or more edge device metrics (edge device state/metrics 128). The update service may analyze the channel metrics and/or edge device metrics and in response, select a new communication channel (or transmission bandwidth) to transmit one or more other update portions to the edge device. For example, the update service may receive an indication of an amount of energy remaining in a battery that powers the edge device. The update service may determine that the energy remaining is below a threshold level and in response, select a new communication channel (or transmission bandwidth) that allows the edge device to consume less battery energy to receive data. In some cases, the new channel (or transmission bandwidth) may use none (or a smaller amount) of the battery's energy for the edge device to receive a given amount of data.

In some embodiments, the edge device manager 118*a* and/or another service of the provider network monitors and stores the state and configuration of the edge device. For example, the edge device state/metrics 128 may also include the current state and/or configuration of the device (e.g., whether the device is connected, what channels the device is communicating on, the physical state of one or more components of the device such as battery level, the software that is currently installed on the device). The edge device state/metrics 128 may also include a future state (e.g., desired state of one or more components, installed software, etc.) of the edge device. For example, a future state of the device may include a successfully installed update 104*a*.

In embodiments, when the transmission progress indicates that all update portions are received, the edge device state/metrics 128 may be updated to indicate that the update transmission is complete. When the update is successfully installed on the edge device, the edge device manager 118*a* may receive an indication of the successful installation and may update the edge device state/metrics 128 to indicate that the update is successfully installed.

In various embodiments, the edge device state/metrics 128 indicate the current power profile of the edge device (e.g., power being used for one or more different components) and/or the current communication channels being used by the edge device (e.g., to perform various functions/applications of the edge device that are not related to updating the edge device). The update service may select, based on the current power profile and/or a current communication channel being used, the communication channel and transmit one or more other update portions to the edge device using the selected channel. Therefore, the update service may wait until the edge device powers on certain components (e.g., radio transmitter) before it begins transmitting update portions using those components. This may allow the update service to take advantage of the normal operation of the edge device without consuming additional power to transmit update portions (or consuming less power than if the update portions were transmitted independent of the normal operation of the edge device).

The above process of receiving metrics, analyzing the metrics, selecting another communication channel (or transmission bandwidth, as discussed above), transmitting one or more other update portions to the edge device, and/or receiving one or more indications from the edge device that transmission of one or more update portions was successful may be repeated any number of times until all portions of the update have been successfully transmitted to the edge device. In embodiments, the update service may determine that all portions of the update have been successfully transmitted in response to receiving indications from the edge device that all portions were successfully transmitted. Furthermore, any of the above analysis and techniques to select new channels and/or transmission bandwidths may also be used to select an initial channel and/or transmission bandwidth.

In the example embodiment, update portion A is transmitted to the edge device 106*a* using communication channel A 124*a* via the Wi-Fi router 134 and update portion B is transmitted to the edge device 106*a* using communication channel N 124*n* via the radio tower 136. As an example, the update service may have switched from using channel A to channel B in response to determining, based on channel metrics, that channel A was no longer available, had less available bandwidth than channel B, or had too many transmission errors for update portions (e.g., a transmission error rate for update portions was above a threshold rate or a number of transmission errors for update portions was above a threshold number). In some embodiments, the update service may send update portions to a particular network address (e.g., internet protocol address) to use a particular channel (e.g., Wi-Fi) and send update portions to a different network address to use a different channel (e.g., satellite or radio).

In embodiments, a reconstructor 138 of the edge device 106 uses the received portions of the update to reconstruct the update 104. After reconstruction, the reconstructor 138 may apply the update 104 to software of the edge device (e.g., software application 140) and/or any firmware components of the edge device. In embodiments, the reconstructor 138 may reconstruct the update and verify the reconstructed update based on code signing (e.g., using a private/public key pair), checksums, and/or any other suitable technique for verifying the authenticity and/or integrity of an update. For example, the update service 100 may use a private key to sign the update before splitting it into portions. After reconstructing the update, the reconstructor may use a public key to verify authenticity of the reconstructed update. In embodiments, the above method of using code signing may be used to verify the authenticity and/or integrity of each update portion received from the update service.

In some embodiments, the update service 100 may insert one or more update portions (or all portions) into unused space of one or more messages that are sent from the provider network to an edge device using one of the communication channels. During the course of operation of an edge device, a provider network may send one or more messages to an edge device for reasons other than sending an update (e.g., as part of input/output operations of an application executing on the edge device).

As an example, the provider network may send computational results or other messages to an edge device that originate from another application on the provider network or anther edge device. In embodiments, the update service 100 may determine that a message to be transmitted from the provider network to the edge device using one of the communication channels comprises unused space (e.g., unused fields or unused space in message headers or message bodies). Prior to transmission of the message to the edge device, the update service 100 may insert one or more portions of the update into the unused space of the message. In some embodiments, the update service splits the update portion into two or more additional portions which may then be transmitted in the unused space of two or more corresponding messages.

In some embodiments, the provider network 102 may include any number of other services 142 that may be used in conjunction with the update service and/or the storage service. For example, a client identity and/or edge device identity service may be used to associate any number of clients with any number of corresponding edge devices. In embodiments, this may allow the update service to determine all of the appropriate edge devices to distribute a new update to, across multiple clients. In some embodiments, this may allow the update service to determine all of the appropriate edge devices to distribute a new update to after a client uploads the new update to the provider network (e.g., via the management APIs at the update service).

In embodiments, an edge device may be any type of computing device (e.g., IoT device) that sends and/or receives data to the provider network and/or the update service. An edge device may be any type of IoT device (e.g., smart devices, sensors, etc.) capable of communicating with other computing devices. In some embodiments, an edge device may collect data from the environment via one or more sensors and/or process collected data. For example, in embodiments, an edge device may be (or include) a microphone, camera, temperature sensing device, humidity detector, vibration detector, smoke detector, motion sensor, etc.

FIG. 2 is a block diagram of an update service that implements opportunistic switching among communication channels to transmit an update to an edge device, according to some embodiments. In the depicted embodiment, the update service 100 of FIG. 1 includes a communication channel analyzer 202 and an update deployer 204. In embodiments, one or more components of the update service 100 of FIG. 1 (e.g., the communication channel allocator) may perform some or all of the functionality described herein for the communication channel analyzer 202 and an update deployer 204.

In embodiments, the communication channel analyzer 202 may perform any of the analysis of metrics described above for FIG. 1. For example, after receiving metrics, the communication channel analyzer 202 may compare metrics from one channel to metrics of one or more of the other channels (or comparing metrics of all channels to each other). The communication channel analyzer 202 may determine, based on comparing metrics, that available bandwidth to transmit data using another communication channel is greater than available bandwidth to transmit data using the communication channel that was initially selected (e.g., taking into account multiple transmission bandwidths, if available on either channel).

In response to the determination that the other communication channel has greater available bandwidth, the communication channel allocator 122 may select the other communication channel. The update deployer 204 may then transmit one or more other update portions to the edge device using the newly selected channel. In embodiments, the update deployer 204 may transmit any update portions to one or more edge devices using any of one or more channels that are selected by the communication channel allocator 122.

In some embodiments, the communication channel analyzer 202 may determine, based on comparing metrics, that an amount of power consumed by the edge device to receive data using another communication channel is less than an amount of power consumed by the edge device to receive data using the communication channel. In response, the communication channel allocator 122 may select the other communication channel and the update deployer 204 may transmit one or more other update portions to the edge device using the newly selected channel. In embodiments, the communication channel allocator 122 may apply any other criteria to determine which new channel to switch to. The communication channel allocator 122 may apply a combination of two or more criteria to determine the new channel.

In the depicted embodiment, the communication channel analyzer 202 may analyze one or more of the communication channel metrics for different channels and/or one or more edge device metrics for an edge device in order to determine one or more channels that match one or more criteria. In response, the communication channel allocator 122 may then select the channel and/or transmission bandwidth (or multiple channels) to use to transmit one or more update portions. As discussed herein, in some embodiments the communication channel allocator 122 may select a time to transmit the one or more update portions using one of the channels and/or using a transmission bandwidth for one of the channels.

The communication channel analyzer 202 may determine, based on analysis of the channel metrics and/or edge device metrics, available transmission bandwidth for each available channel. If the channel selection criteria is to select the channel with the highest available bandwidth, then the channel with the highest available transmission bandwidth will be selected by the communication channel allocator 122. In embodiments, if the criteria is to select the two (or more) channels with the highest bandwidth, then the two (or more) channels with the highest available transmission bandwidth will be selected by the communication channel allocator 122. The channel allocator may then allocate different update portions to different channels (e.g., randomly or in sequence) for deployment by the update deployer.

In some embodiments, the communication channel allocator 122 may use two or more criteria to determine which channel (or channels) to select for deployment update portion of an update. For example, in some embodiments the criteria may be to select the channel with the highest available transmission bandwidth that also allows the edge device to consume less than a threshold amount of power to receive data (e.g., to receive one or more update portions). In some embodiments, the criteria may be to select the channel with the highest available transmission bandwidth that also has a transmission failure rate below a threshold rate (e.g., based on previously collected metrics for the channel and/or specifications for the channel).

In embodiments, the criteria may be to select the channel that has a transmission failure rate below a threshold rate (e.g., based on previously collected metrics for the channel and/or specifications for the channel) that also allows the edge device to consume less than a threshold amount of power to receive data (e.g., to receive one or more update portions). In embodiments, three of more of the above criteria may be used (or any other criteria associated with transmission performance and/or edge device performance) in order for the communication channel allocator 122 to select a channel (or channels) to use to transmit one or more portions.

In some embodiments, the communication channel allocator 122 may use one or more criteria to select a time to transmit the one or more update portions using one of the channels and/or using a transmission bandwidth for one of the channels. For example, in some embodiments the criteria may be to select a time to transmit one or more portions of the update using the communication channel or using the transmission bandwidth for the communication channel based on 1) the available bandwidth to transmit data using the respective communication channels and 2) update timing 206 data that includes a whitelist of available times to transmit the one or more portions to the edge device and/or a time that an update window opens for applying the update to the edge device. For example, the communication channel allocator may select a channel that has a high enough bandwidth to transmit all of the update portions (or remaining portions) to the edge device during the remaining one or more whitelist times before an update deadline for transmission of the update (e.g., by the start of the update window).

For example, update timing 206 may include a "whitelist" of available times to transmit update portions to a device (e.g., 1 pm-1:30 pm each day). Update timing 206 may also include a "blacklist" of times during which update portions cannot be transmitted to the edge device (e.g., 1:30 pm-1 pm next day). In embodiments, updates may be applied during an update time window that starts at a certain date and/or time and/or ends at another date and/or time (e.g., specified in update timing 206).

In embodiments, the update service may use the above time-related aspects of an update, as well as other metrics (e.g., available bandwidth for each channel, power consumed using each channel) to select a channel and/or a transmission bandwidth of a selected channel for transmitting update portions to the edge device in order to transmit the update to the edge device on time (e.g., by a deadline for transmission of the update to the edge device) while also meeting other goals (e.g., minimize power consumption to transmit the update/cost of the update). For example, the update service may determine/select a particular channel from among the available channels that have at least a minimum transmission bandwidth capable of transmitting all of the update portions (or remaining portions that have not yet been transmitted) to the edge device before the update transmission deadline (e.g., before the update time window begins), while also causing the least power consumption at the edge device.

In various embodiments, the communication channel analyzer 202 may be capable of analyzing any combination of one or more channel metrics and/or edge device metrics in order to produce results (e.g., transmission bandwidth, transmission failure rate, power consumption, etc.) for each channel. The communication channel allocator 122 may then select a channel (or multiple channels) with results that meet the one or more criteria. In embodiments, the one or more criteria may be provided by a client (e.g., through management APIs). In some embodiments, some or all of the one or more channel selection criteria may be provided by the provider network (e.g., as default selection criteria).

In some embodiments, the communication channel allocator 122 may take into account the update urgency 116 in order to select a channel. In embodiments, if the update urgency 116 is above a threshold level, then the communication channel allocator 122 may override the one or more selection criteria. For example, if the update urgency is at or below a threshold level (e.g., low or medium urgency level), then the communication channel allocator 122 may select a channel with lower available bandwidth that may result in less power consumption at the edge device to receive update portions. However, if the update urgency is above the threshold level (e.g., high urgency level), then the communication channel allocator 122 may select a channel with higher available bandwidth that may result in more power consumption at the edge device to receive update portions.

In embodiments, if the update urgency 116 is below a threshold level, then the communication channel allocator 122 may override the one or more selection criteria. For example, if the update urgency is at or above a threshold level (e.g., medium or high urgency level), then the communication channel allocator 122 may select a channel with higher available bandwidth that may result in more power consumption at the edge device to receive update portions. However, if the update urgency is below the threshold level (e.g., low urgency level), then the communication channel allocator 122 may select a channel with lower available bandwidth that may results in less power consumption at the edge device to receive update portions.

In some embodiments, the communication channel allocator 122 may take into account the update urgency 116 in order to select a channel. In embodiments, if the update urgency 116 is above a threshold level, then the communication channel allocator 122 may override the one or more selection criteria. For example, if the update urgency is at or below a threshold level (e.g., low or medium urgency level), then the communication channel allocator 122 may select a channel with lower available bandwidth that may result in less power consumption at the edge device to receive update portions. However, if the update urgency is above the threshold level (e.g., high urgency level), then the communication channel allocator 122 may select a channel with higher available bandwidth that may result in more power consumption at the edge device to receive update portions.

FIG. 3 is a block diagram of an edge device that implements opportunistic switching among communication channels to receive an update, according to some embodiments. As shown, an edge device 106 that is to receive an update (e.g., any of the edge devices of FIG. 1), includes an update manager 300.

In embodiments, the update manager 300 of edge devices may perform some or all of the functionality of the update service 100 of FIGS. 1 and 2 in order for the provider network to successfully transmit the portions of an update (e.g., update 104*a*) to the edge device. Therefore, some or all of the opportunistic channel-switching decisions may be performed by the edge device such that the channel (or channels) that are used to transmit the update portions from the provider network to the edge device are determined by the edge device. After all of the portions of the update are received, the reconstructor 302 may then reconstruct the update using each of the portions and apply the update to the edge device.

In some embodiments, the reconstructor 302 may apply the update to a software application 304. In embodiments, the reconstructor 302 may apply the update to a firmware-based component of the edge device, such as a processor 306, a network interface 308, or another hardware resource 310. For example, the firmware-based component may be a field-programmable gate array (FPGA) or any other type of programmable hardware component. As shown, the edge device also includes one or more batteries 312 that may provide some or all of the power consumed by the edge device.

In the depicted embodiment, the edge device includes a communication channel analyzer 314 and a communication channel selector 316. In embodiments, the communication channel selector 316 may perform the same functions and/or similar functions as described for the communication channel allocator 122 of FIGS. 1 and 2. In embodiments, the communication channel analyzer 314 may perform the same functions and/or similar functions as described for the communication channel analyzer 202 of FIG. 2.

For example, the communication channel analyzer 314 may analyze one or more of the communication channel metrics 318 for different channels used by the edge device and/or one or more edge device metrics (edge device state/ metrics 320) for the edge device in order to determine one or more channels that match one or more criteria. The communication channel selector 122 may then select the channel (or multiple channels) that matches (or meets) the one or more criteria. The edge device may then receive one or more update portions of the update from the update service 100 using the selected channel (or channels).

In embodiments, in response to selecting the channel, the communication channel selector 122 may transmit to the update service 100 an indication of the selected channel. The update service may then begin transmitting one or more portions of the update to the edge device using the selected channel (or channels). Therefore, the channel (or channels) that are used to transmit the update portions from the provider network to the edge device may be determined by the edge device. As described for FIG. 1, the initial channel for receiving update portions from the update service 100 may also be selected based on analysis of one or more of the communication channel metrics 318 for different channels used by the edge device and/or one or more edge device metrics for the edge device.

In response to receiving an update portion and/or verifying that the entire update portion was received (e.g., validating the authenticity and/or integrity of the update portion using code signing and/or checksums), the update manager 300 may transmit to the provider network an indication that transmission of the update portion was successful. In the depicted embodiment, the update manager 300 keeps track of the transmission progress 322 of the update to the edge device by storing an indicator 324 for each update portion that indicates whether transmission of the update portion to the edge device was successful. As shown, the operating memory 326 (e.g., random access memory) of the edge device may include the communication manager 300, the reconstructor 302, and the one or more applications 304 for execution by the one or more processors 306.

As discussed above, the edge device state/metrics 320 may indicate the current power profile of the edge device (e.g., power being used for one or more different components) and/or the current communication channels being used by the edge device (e.g., to perform various functions/applications of the edge device that are not related to updating the edge device). The communication channel selector 316 may select, based on the current power profile and/or a current communication channel being used, the current communication channel for receiving update portions. The edge device may send to the update service an indication the selected channel and receive additional update portions using the selected channel.

In embodiments, the edge device may wait until it powers on certain components (e.g., radio transmitter) for normal operation (e.g., various functions/application that the edge device is designed for) before it begins receiving update portions using those components. This may allow the update service to take advantage of the normal operation of the edge device to transmit update portions without the edge device consuming additional power to receive update portions (or consuming less power than if the update portions were transmitted independent of the normal operation of the edge device).

FIG. 4 illustrates a system for opportunistic switching among communication channels to transmit updates to different edge devices of a client network, according to some embodiments. In the depicted embodiment, a client network 108 includes a Wi-Fi router 400 that wirelessly sends and receives data to edge device 402, edge device 404, and network device 406. The network device 406 uses Bluetooth to wirelessly communicate with the edge device 408 and the edge device 402.

As shown, the client network 108 also includes a management device 410. In embodiments, a user may use management device (e.g., via a graphical user interface or command line interface) to send commands and other data to the update service via the management APIs 412 in order to configure functionality of the update service. For example, as described above, the management APIs may be used by a client to upload an update that is to be distributed to edge devices, or to provide the selection criteria that may be used to select communication channels.

In embodiments, users may also use the management APIs 412 (e.g., via one or more management devices 410) to configure any other functionality of the update service as described herein. For example, users may configure the number of portions to split an update into, which channels are to be available for transmitting update portions to a device, which edge devices are to receive an update, whether to use default configurations for any functionality, etc. In embodiments that use edge devices with update managers as described in FIG. 3, users may use one or more management devices 410 to configure any functionality of the update manager via management APIs of an edge device.

In various embodiments, any number of other client networks 414 may use the update service 100. Each of the other client networks 414 may include any number of edge devices that may receive one or more updates from the update service 100. In some embodiments, an update may be client-specific (e.g., provided by the client to the update service to be distributed only to the client's edge devices). In some embodiments, an update may be edge device-specific (e.g., an edge device made by a particular manufacturer), so that a particular update may be transmitted to edge devices of multiple different client networks.

In the depicted embodiment, different edge devices of the client network may receive an update using a different combination of communication channels. In particular, the edge device 402 receives one or more update portions using a Wi-Fi communication channel (e.g. via the Wi-Fi router 400), receives one or more update portions using a Bluetooth communication channel (e.g. via the network device 406, which receives the update portion from the Wi-Fi router 400), and receives one or more update portions using short-range communication channel (e.g. via the update drone 416).

In embodiments, the update drone 416 may include one or more devices that allow the drone to transmit one or more update portions to the edge device 402. Any communication channel capable of transmitting data may be used by the drone to transmit update portions to an edge device, such as one or more of Wi-Fi, cellular, Bluetooth, digital subscriber line, microwave, satellite, radio, infrared, visible light, and audio). Depending on the hardware of the edge device, one or more of the drone communication channels may be used. For example, an edge device with a microphone may receive update portions from the drone via sound waves, an edge device with a camera may receive update portions from the drone using visible light, etc.

As shown, the edge device 408 receives one or more update portions using a Bluetooth communication channel (e.g. via the network device 406, which receives the update portion from the Wi-Fi router 400), and receives one or more update portions using a radio communication channel (e.g. via the radio tower 136). Also depicted is the edge device 404, which receives one or more update portions using a Wi-Fi communication channel (e.g. via the Wi-Fi router 400), receives one or more update portions using a radio communication channel (e.g. via the radio tower 136), and receives one or more update portions using a satellite communication channel (e.g. via the satellite 418).

In some embodiments, the update drone 416 may receive one or more update portions from the update service via radio communication or any other form of wireless communication before flying within a threshold distance of the edge device that allows the drone to transmit one or more update portions using a selected communication channel. In some embodiments, the drone 416 may receive update portions using a physical network connection (e.g., at the provider network or another client location) before the drone flies to the one or more different locations to update corresponding edge devices. In embodiments, the satellite may receive one or more update portions from the update service via radio communication or any other form of wireless communication before transmitting the update portions to edge devices.

As discussed above, each of the communication channels for a particular edge device may be used during different time windows due to changes in channel metrics. For example, if the highest available bandwidth is used as the one or more criteria for selecting a channel for the edge device 402, then the Wi-Fi channel may be initially used after a determination that it has the highest available bandwidth. At a later point, it may be determined that the Bluetooth channel (e.g., via network device 406) has the highest available bandwidth, so the Bluetooth channel is selected for use. This may occur, for example, if the Wi-Fi router 400 stops transmitting or experiences interference.

At a later point, it may be determined that a radio channel of the drone 416 has the highest available bandwidth, so the radio channel of the drone 416 is selected for use. This may occur, for example, if the network device 406 stops transmitting or experiences interference. In embodiments, the radio channel of the drone 416 is selected for use only if the drone 416 is currently within the required threshold for communication with the edge device 402 (e.g., within 300 feet) or if the drone 416 is capable of arriving to a location within the required threshold for communication with the edge device 402 within a threshold period of time (e.g., 10 minutes, 1 hour, etc.).

Figure 5:
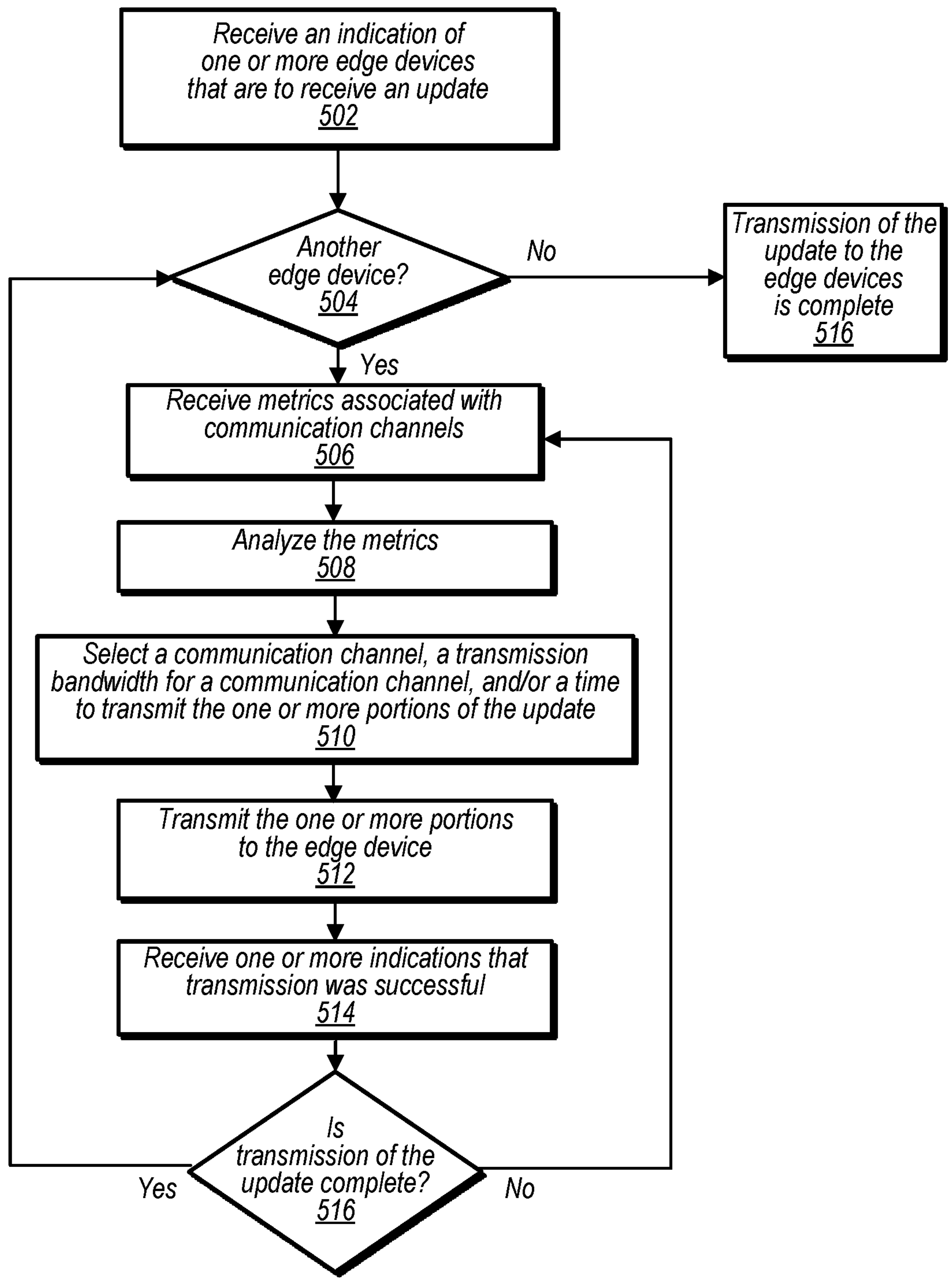
FIG. 5 is a flow diagram that illustrates opportunistic switching among communication channels to transmit an update from a provider network to one or more edge devices, according to some embodiments.

FIG. 5 is a flow diagram that illustrates opportunistic switching among communication channels to transmit an update from a provider network to one or more edge devices, according to some embodiments. At block 502, the update service receives an indication (e.g., from a client or other source) of one or more edge devices of one or more remote networks that are to receive an update.

At block 504, the update service determines whether there is another edge device that needs to receive the update. If so, then at block 506, the update service one or more metrics associated with respective communication channels that the edge device is configured to use. At block 508, the update service analyzes the one or more metrics. At block 510, in response to the analysis of the one or more metrics, the update service selects a communication channel, another transmission bandwidth for the current communication channel, and/or a time to transmit the one or more portions of the update (e.g., a time to begin the transmission of the one or more portions) using a selected communication channel or using a transmission bandwidth of the selected current channel (e.g., selected based on the time aspects, as discussed above). For example, the update service may select the channel and/or transmission bandwidth with the highest available bandwidth. As discussed, the update service may select an initial channel in response to the analysis. If the update service has already transmitted one or more portions using a currently selected channel, then in some embodiments it may select the current channel and/or transmission bandwidth again. However, in some cases, the update service may switch to a different channel based on the analysis.

At block 512, the update service then transmits one or more portions of the update to the edge device in accordance with the selection made at block 510 (e.g., using the selected communication channel, the selected transmission bandwidth for the communication channel, and/or at the selected time using a selected channel and/or bandwidth). At block 514, the update service may receive one or more indications from the edge device that the transmission of at least one of the one or more update portions to the edge device using the selected channel was successful. In embodiments, if the update service does not receive an indication of successful transmission for a particular portion within a threshold period of time, then it may re-transmit the portion using the same or different channel.

At block 516, the update service determines whether transmission of the update to the edge device is complete (e.g., all portions of the update have been transmitted). If not, then the process returns to block 506. If transmission of the update to the edge device is complete, then at block 504, the update service determines whether there is another edge device that needs to receive the update. If so, then the process begins again at block 506 for another device. If there are no more devices that require an update, then at block 518, the update service may determine that transmission of the update to the edge devices is complete.

Figure 6:
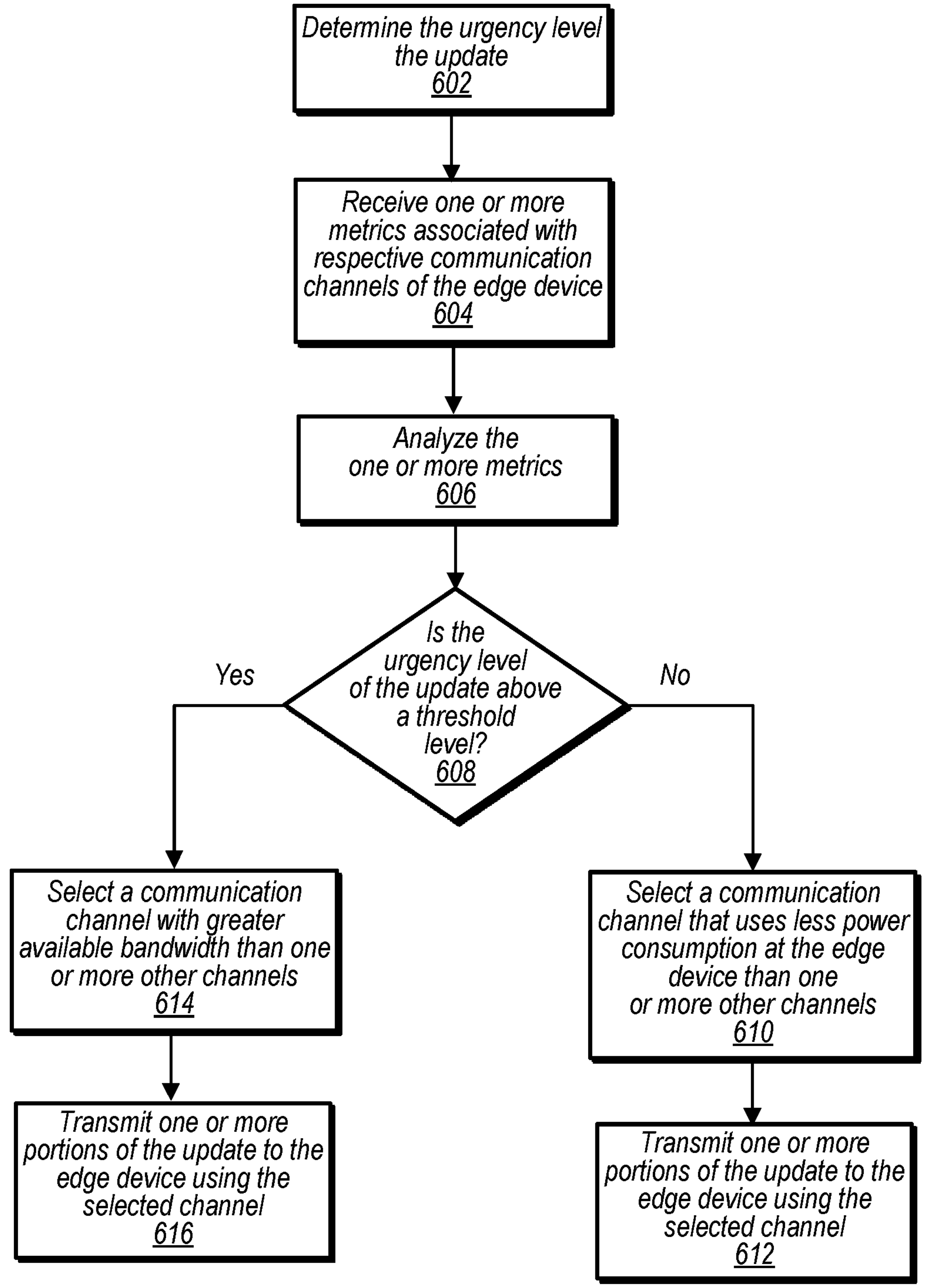
FIG. 6 is a flow diagram that illustrates opportunistic switching among communication channels to transmit an update to and edge device based on an update urgency level, according to some embodiments.

FIG. 6 is a flow diagram that illustrates opportunistic switching among communication channels to transmit an update to and edge device based on an update urgency level, according to some embodiments. At block 602, the update service determines an update urgency level for an update.

At block 604, the update service receives one or more metrics associated with respective communication channels of an edge device. At block 606, the update service analyzes the one or more metrics (e.g., to determine available bandwidth of each channel and to determine how much power is consumed by the edge device to receive data using each channel). At block 606, the update service determines whether the update urgency level is above a threshold level.

If the update service determines that the update urgency level is below a threshold level, then at block 610, the update service may select a communication channel that uses less power consumption (or the least) at the edge device than other channels to receive data (e.g., based on one or more criteria). At block 612, the update service may then transmit one or more portions of the update to the edge device using the selected channel.

At block 608, if the update service determines that the update urgency level is above a threshold level, then at block 614, the update service may select a communication channel with greater available bandwidth (or the highest available bandwidth) than other channels to receive data. Therefore, the update service may override the one or more criteria (e.g., criteria to select channels with lower power consumption) because of the high update urgency level. At block 616, the update service may then transmit one or more portions of the update to the edge device using the selected channel.

Figure 7:
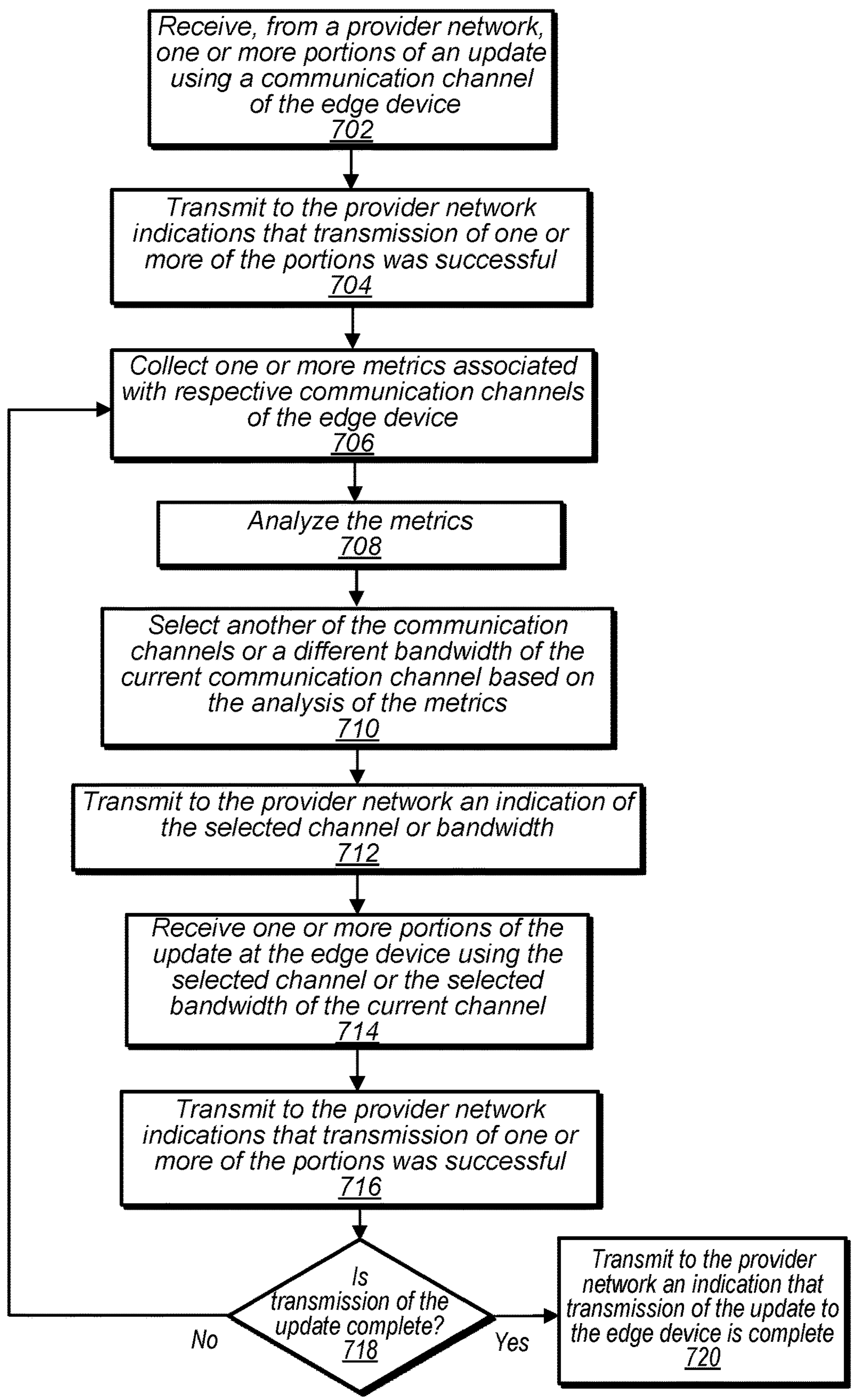
FIG. 7 is a flow diagram that illustrates opportunistic switching among communication channels at an edge device to receive an update from a provider network, according to some embodiments.

FIG. 7 is a flow diagram that illustrates opportunistic switching among communication channels at an edge device to receive an update from a provider network, according to some embodiments. At block 702, receives from a provider network one or more portions of an update at an edge device using a communication channel. At block 704, the edge device transmits to the provider network one or more indications that transmission of one or more portions of the update was successful.

At block 706, the edge device collects one or more metrics associated with each of the communication channels that the edge device is configured to use. At block 708, the edge device analyzes the metrics. In embodiments, the analysis may determine the available bandwidth for each channel, the power consumed by the edge device when using each channel, and/or a transmission failure rate for each channel.

At block 710, the edge device may select another of the communication channels or a different bandwidth of the currently selected communication channel (e.g., the channel that was used to receive the previous one or more update portions) in response to the analysis of the one or more metrics. For example, the edge device may continue using the selected channel and/or transmission bandwidth or select a different channel and/or transmission bandwidth than the channel that was previously being used. As discussed herein, the edge device may select the initial channel and/or transmission bandwidth to begin transmitting update portions in response to the analysis. At block 712, the edge device transmits to the provider network (e.g., the update service) an indication of the selected channel and/or selected bandwidth of the current communication channel. The edge device may then receive one or more other portions of the update at the edge device from the provider network using the selected communication channel.

At block 716, the edge device transmits to the provider network one or more indications that transmission of at least one of the one or more additional portions of the update was successful. In some embodiments, the edge device may determine that transmission of one or more portions was not successful (e.g., based on a verification check using code signing, checksums, etc.), and therefore transmit to the update service an indication that the one or more of the transmissions was not successful. In response, the update service may re-transmit the one or more portions using the same channel or a different channel.

At block 718, the edge device determines whether transmission of the update to the edge device is complete (e.g., all portions of the update have been transmitted). If not, then the process returns to block 706. If transmission of the update to the edge device is complete, then at block 720, the update service transmits to the provider network an indication that transmission of the update to the edge device is complete.

Any of various computer systems may be configured to implement processes associated with the provider network, base station, hub devices, edge devices, tier devices, or any other component of the above figures. For example, FIG. 8 is a block diagram illustrating an example computer system that implements some or all of the techniques described herein, according to some embodiments.

Figure 8:
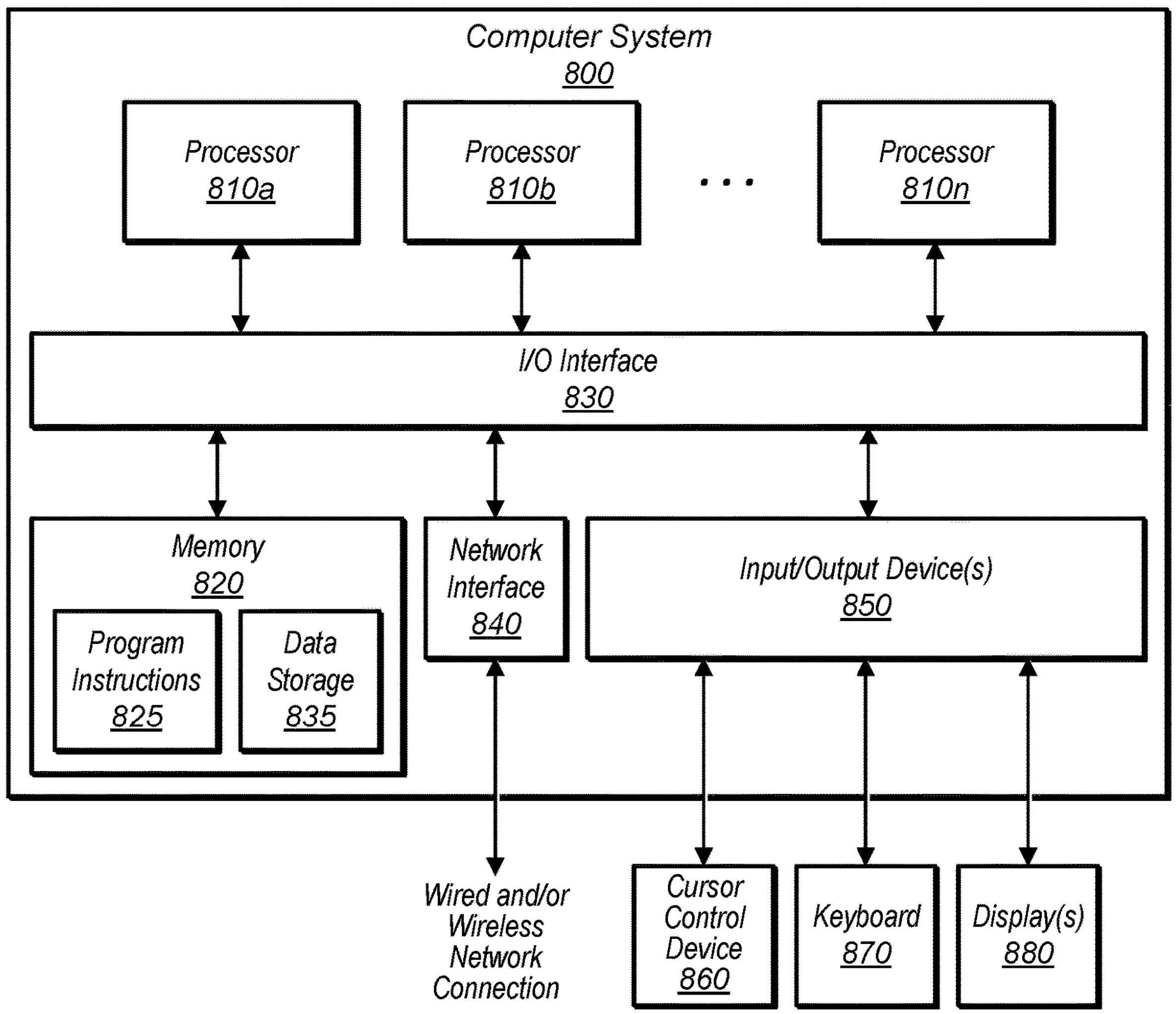
FIG. 8 is a block diagram illustrating an example computer system that implements some or all of the techniques described herein, according to some embodiments.

In various embodiments, the provider network, client network, edge devices, update service, or any other component of any of FIGS. 1-4 may each include one or more computer systems 1900 such as that illustrated in FIG. 8. In embodiments, the provider network, client network, edge devices, update service, or any other component may include one or more components of the computer system 800 that function in a same or similar way as described for the computer system 800.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing enterprise logic or downloadable application, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the file gateway, object storage system, client devices, or service provider are shown stored within system memory 820 as program instructions 825. In some embodiments, system memory 820 may include data 835 which may be configured as described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other computer systems 800 or devices attached to a network, such as the local network discussed above, a wide-area network, or a local network within the provider network, for example. In particular, network interface 840 may be configured to allow communication between computer system 800 and/or various I/O devices 850. I/O devices 850 may include scanning devices, display devices, input devices and/or other communication devices, as described herein. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices 850 may be relatively simple or "thin" client devices. For example, I/O devices 850 may be configured as dumb terminals with display, data entry and communications capabilities, but otherwise little computational functionality. However, in some embodiments, I/O devices 850 may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices 850 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 850 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 800. In general, an I/O device 850 (e.g., cursor control device 860, keyboard 870, or display(s) 880 may be any device that can communicate with elements of computing system 800.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the update service, storage service, other services, edge devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:

one or more computing devices of a provider network comprising respective processors and memory to implement an update service for one or more clients to:

receive an indication of one or more edge devices of one or more remote networks that are to receive an update; and for individual ones of the one or more edge devices:

transmit one or more portions of the update to the edge device using one of a plurality of communication channels that the edge device is configured to use, wherein the one or more portions are transmitted using a transmission bandwidth for the communication channel;

receive one or more indications from the edge device that the transmission of at least one of the one or more portions of the update using the communication channel was successful;

receive one or more metrics associated with respective communication channels of the plurality of communication channels;

analyze the one or more metrics associated with the respective communication channels;

based on the analysis of the one or more metrics associated with different channels of the respective communication channels that the edge device is configured to use:

select another of the communication channels to transmit one or more other portions of the same update;

select a time to transmit the one or more other portions of the same update using the other selected communication channel; and transmit the one or more other portions of the same update to the edge device using the other selected communication channel in accordance with the selection of the time to transmit, wherein the communication channel used to transmit the one or more portions of the update is different than the other selected communication channel used to transmit the one or more other portions of the same update; and receive one or more indications from the edge device that the transmission of at least one of the one or more other portions of the same update to the edge device was successful.

2. The system as recited in claim 1, wherein to analyze the one or more metrics, the one or more computing devices are configured to implement the update service to:

determine that available bandwidth to transmit data using the other communication channel is greater than available bandwidth to transmit data using the communication channel; and wherein the one or more computing devices are configured to implement the update service to:

based on the determination, select the other communication channel to transmit the one or more other portions of the update.

3. The system as recited in claim 1, wherein to analyze the one or more metrics, the one or more computing devices are configured to implement the update service to:

determine that an amount of power consumed by the edge device to receive data using the other communication channel is less than an amount of power consumed by the edge device to receive data using the communication channel; and wherein the one or more computing devices are configured to implement the update service to:

based on the determination, select the other communication channel to transmit the one or more other portions of the update.

4. The system as recited in claim 1, wherein the one or more computing devices are configured to implement the update service to:

subsequent to transmitting the one or more other portions of the update to the edge device using the other selected communication channel:

receive one or more other metrics associated with respective communication channels of the plurality of communication channels;

analyze the one or more other metrics;

in response to the analysis of the one or more other metrics:

select an additional one of the communication channels to transmit one or more additional portions of the update; and transmit the one or more additional portions of the update to the edge device using the additional communication channel.

5. A method, comprising:

performing, by one or more computing devices of a provider network:

for individual ones of the one or more edge devices of one or more remote networks:

receiving one or more metrics associated with respective communication channels of a plurality of communication channels that the edge device is configured to use;

analyzing the one or more metrics associated with the respective communication channels; and based on analyzing the one or more metrics associated with different channels of the respective communication channels that the edge device is configured to use:

selecting one of the communication channels;

selecting a time to transmit one or more portions of an update using the selected communication channel; and transmitting the one or more portions of the update to the edge device using the selected communication channel in accordance with the selection of the time to transmit, wherein at least another portion of the same update is transmitted to the edge device using a different channel than the selected communication channel.

6. The method as recited in claim 5, wherein analyzing the one or more metrics comprises:

determining that available bandwidth to transmit data using the communication channel is greater than available bandwidth to transmit data using one or more other ones of the communication channels, and further comprising:

based on the determining, selecting the communication channel to transmit one or more other portions of the update.

7. The method as recited in claim 6, wherein an urgency level of the update is above a threshold level, and wherein selecting the communication channel comprises:

selecting the communication channel with greater available bandwidth based on the analysis and an indication that the urgency level of the update is above the threshold level.

8. The method as recited in claim 5, wherein analyzing the one or more metrics comprises:

determining that an amount of power consumed by the edge device to receive data using the communication channel is less than an amount of power consumed by the edge device to receive data using one or more other ones of the communication channels, and further comprising:

based on the determining, selecting the communication channel to transmit the one or more other portions of the update.

9. The method as recited in claim 8, wherein an urgency level of the update is below a threshold level, and wherein selecting the communication channel comprises:

selecting the communication channel that uses less power consumption based on the analysis and an indication that the urgency level of the update is below the threshold level.

10. The method as recited in claim 5, wherein analyzing the one or more metrics comprises:

determining available bandwidth to transmit data using the respective communication channels; and further comprising:

selecting the time to transmit the one or more portions of the update using the selected communication channel or using the transmission bandwidth for the selected communication channel based on the available bandwidth to transmit data using the respective communication channels and further based on one or more of:

a whitelist of available times to transmit the one or more portions of the update to the edge device, or a time that an update window opens for applying the update to the edge device.

11. The method as recited in claim 5, further comprising:

determining that a message to be transmitted from the provider network to the edge device using the communication channel comprises unused space; and prior to transmission of the message to the edge device, inserting an additional portion of the update into the unused space of the message.

12. The method as recited in claim 5, further comprising:

receiving one or more additional metrics associated with respective communication channels of the plurality of communication channels that are available to send data to the edge device;

analyzing the one or more additional metrics; and in response to the analysis of the one or more additional metrics:

selecting another of the plurality of communication channels to transmit one or more other portions of the update;

selecting another transmission bandwidth for the other selected communication channel to transmit the one or more other portions of the update, or selecting another time to transmit the one or more other portions of the update using the other selected communication channel or another particular transmission bandwidth for the communication channel; and transmitting the one or more other portions of the update to the edge device in accordance with the selection of the other transmission bandwidth or the other time to transmit.

13. The method as recited in claim 5, wherein the plurality of communication channels comprises two or more of Wi-Fi, cellular, Bluetooth, digital subscriber line, microwave, satellite, radio, infrared, visible light, and audio.

14. The method as recited in claim 5, wherein transmitting one or more portions of the update to the edge device using the communication channel comprises:

uploading the one or more portions of the update to a drone; and transmitting the one or more portions of the update from the drone to the edge device using the communication channel.

15. One or more non-transitory computer-accessible storage media storing program instructions that when executed on or across one or more processors:

receive from a provider network one or more portions of an update at an edge device using one of a plurality of communication channels that the edge device is configured to use;

transmit to the provider network one or more indications that transmission of at least one of the one or more portions of the update was successful;

collect one or more metrics associated with respective communication channels of the plurality of communication channels;

analyze, by the edge device, the one or more metrics associated with different channels of the respective communication channels;

based on the analysis, by the edge device, of the one or more metrics associated with different channels of the respective communication channels that the edge device is configured to use:

select, by the edge device, another of the communication channels; and receive, by the edge device, one or more other portions of the same update at the edge device using the other selected communication channel, wherein the communication channel used to receive the one or more portions of the update is different than the other selected communication channel used to receive the one or more other portions of the same update; and transmit to the provider network one or more indications that transmission of at least one of the one or more other portions of the same update was successful.

16. The one or more storage media as recited in claim 15, wherein the program instructions when executed on or across the one or more processors:

reconstruct the update using at least the one or more portions received over the communication channel and the one or more other portions received over the other communication channel or the different bandwidth of the communication channel; and transmit to the provider network an indication that transmission of the update to the edge device is complete.

17. The one or more storage media as recited in claim 15, wherein the program instructions when executed on or across the one or more processors:

in response to the selection of the other communication channel or the different bandwidth of the communication channel, transmit to the provider network an indication of the selection.

18. The one or more storage media as recited in claim 15, wherein to analyze the metrics, the program instructions when executed on or across the one or more processors:

determine that available bandwidth to transmit data using the other communication channel is greater than available bandwidth to transmit data using the communication channel; and wherein the program instructions when executed on or across the one or more processors:

based on the determination, select the other communication channel.

19. The one or more storage media as recited in claim 15, wherein to analyze the metrics, the program instructions when executed on or across the one or more processors:

determine that an amount of power consumed by the edge device to receive data using the different bandwidth of the communication channel is less than an amount of power consumed by the edge device to receive data using a current bandwidth of the communication channel; and wherein the program instructions when executed on or across the one or more processors:

based on the determination, select the different bandwidth of the communication channel.

20. The one or more storage media as recited in claim 19, wherein an urgency level of the update is below a threshold level, and wherein to select the different bandwidth of the communication channel, the program instructions when executed on or across the one or more processors:

select the different bandwidth of the communication channel that uses less power consumption based on the analysis and an indication that the urgency level of the update is below the threshold level.

* * * * *